United States Patent
Adam et al.

[15] 3,673,694
[45] July 4, 1972

[54] SETTING DEVICE FOR A BORING TOOL

[72] Inventors: Robert Adam, 463 Nagle Road, Erie, Pa. 16511; Dayle Keefer, R. D. #2, Luther Road, Girard, Pa. 16417

[22] Filed: March 26, 1970

[21] Appl. No.: 22,877

[52] U.S. Cl. .................................... 33/185 R, 33/172 B
[51] Int. Cl. ............................................. B27g 23/00
[58] Field of Search ............. 33/185 R, 181 R, 172 B, 172 R, 33/169 R, 148 E, 148 A, DIG. 17

[56] References Cited

UNITED STATES PATENTS

| | | |
|---|---|---|
| 2,657,468 | 11/1953 | Lyons..................................33/172 B |
| 1,319,361 | 10/1919 | Rouanet...............................33/172 B |
| 3,222,788 | 12/1965 | Neslund...............................33/148 E |
| 2,827,707 | 3/1958 | Croshier et al......................33/169 R |
| 3,184,856 | 5/1965 | Theuerkauf et al................33/169 R |

Primary Examiner—William D. Martin, Jr.
Attorney—Charles L. Lovercheck

[57] ABSTRACT

This specification discloses a fixture suitable for use in machine shops for setting boring tools for boring holes to accurate dimensions. The fixture has a frame on which a dial indicator is supported in position spaced from a plunger. A rocking bar is supported on a fulcrum between the indicator and the plunger. The distance from the dial indicator point to the fulcrum is twice the distance from the plunger to the fulcrum. The fixture base has pads on it suitable to be supported on a machine table.

3 Claims, 2 Drawing Figures

PATENTED JUL 4 1972  3,673,694

Inventor
ROBERT ADAM
DAYLE KEEFER
By Charles L. Lovercheck
Attorney

SETTING DEVICE FOR A BORING TOOL

STATEMENT OF INVENTION

This invention relates to machine tools and, more particularly, to fixtures for setting of boring tools.

OBJECTS OF THE INVENTION

It is an object of the invention to provide an improved fixture for use with a boring mill.

Another object of the invention is to provide an improved tool setting gage.

Yet another object is to provide an improved fixture to save time and eliminate guesswork in setting boring tools.

DETAILED DESCRIPTION OF THE DRAWINGS

Figure 1:
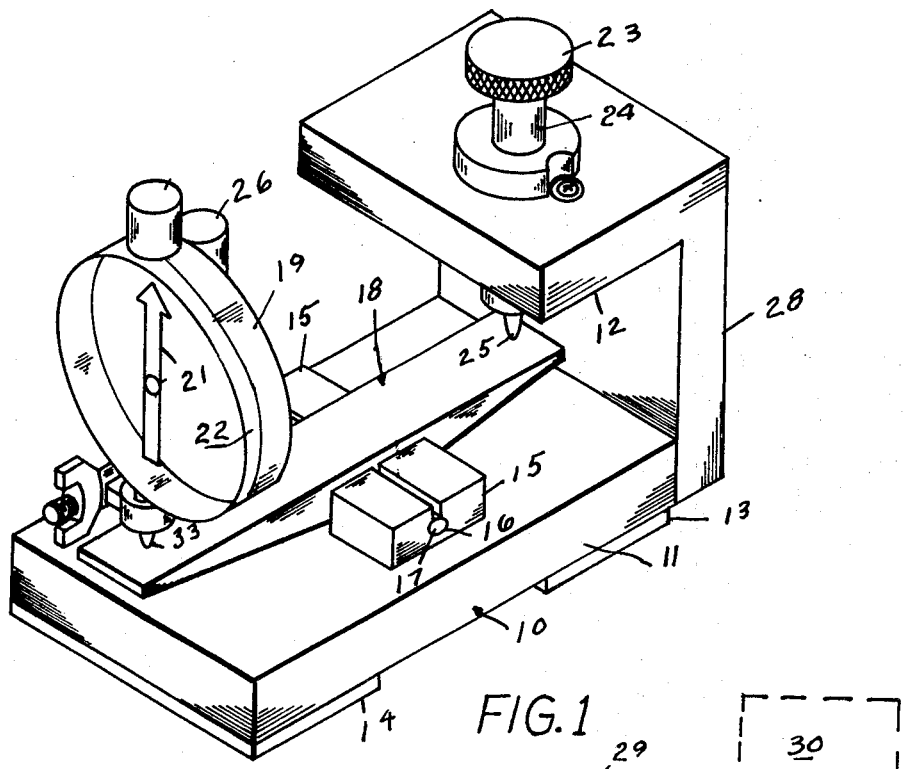
FIG. 1 is an isometric view of the machine according to the invention.
Figure 2:
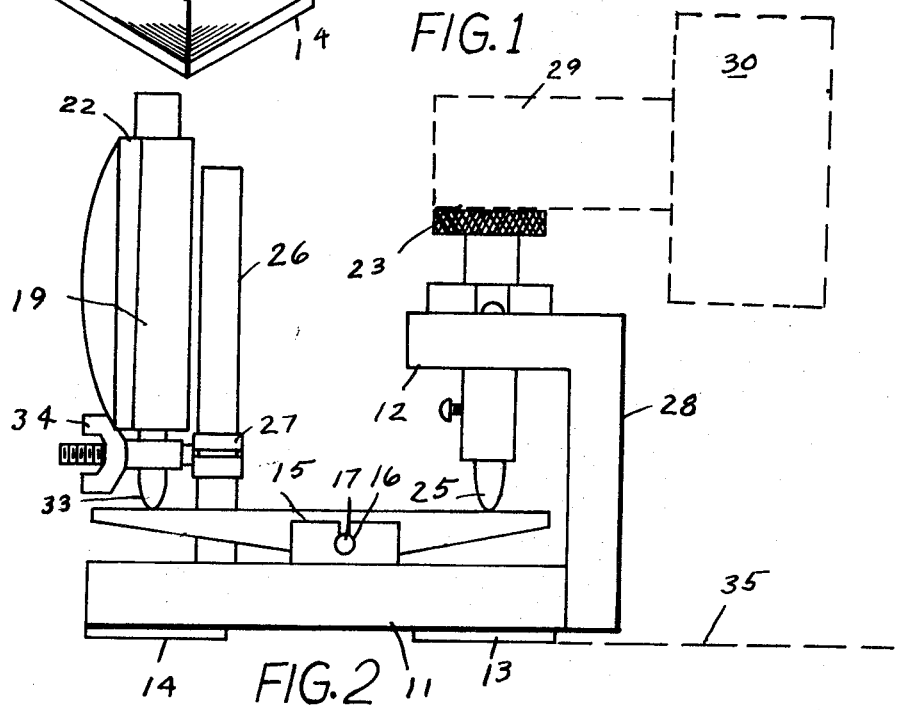
FIG. 2 is a side view of the fixture shown on a boring mill table.

Now with more particular reference to the drawings, the fixture shown in FIG. 1 has a frame 10 having a base 11 with a beam 12 integrally supported to the base by means of the column 28 so that the beam overlies the base 11. The base 11 has pads 13 and 14 which have a machined bottom surface suitable to rest on the top of a machined table. The bottom of the pads 13 and 14 are perpendicular to the side edges of the beam 12 and base 11. Ears 15 are fixed to the top of the base and a bearing 16 is formed in the ears 15. The axle 17 is received in the bearing 16 and the axle 17 is fixed to the beam 18. The beam 18 has the axle 17 fixed to it at a position one-third of the way from the point 25 to the point 33. Plunger 24 is reciprocally supported in beam 12 and has pad 23 fixed to its top.

The dial indicator 19 is supported on the post 26. Dial indicator 19 is of a type familiar to those skilled in the art. The post 26 is fixed to the top of the base 11. The dial indicator may be adjusted up and down on post 26 by means of the bracket 27 which is clamped by means of a thumb screw 34. The fixture may be supported on a boring mill table indicated at 35 and test bar 29 can be chucked in the chuck 30. The dial indicator has a pointer 21 and is reset by adjusting up and down on post 26 and fine setting is made by moving face of dial 22 in a conventional manner.

To set the boring bar to bore a hole, the test bar 29 is first chucked in the chuck 30 and the head moved until the needle 21 on the gage dial indicator indicates zero and take a reading of the measuring device on machine. To set boring bar, subtract diameter of test bar from diameter of hole to be bored, divide the remainder by 2, move machine head containing boring bar and tool this distance from original setting "0" on gage, set boring tool to same "0" setting on presetter or gage, and bore hole. Example: 1.000 inch test bar, set gage to "0", by contacting gage plunger to test bar, 2.000 inch hole to be bored. Subtract 1.000 inch from 2.000 inches = 1.000 inch, divide by 2 and the result is 0.500 inch, distance to move in proper direction the boring tool and head. Now move tool to contact gage plunger so indicator dial reads "0" on setting gage and bore hole. The hole may then be precisely bored in the piece of material fixed to the machine table 35. The fixture makes it possible to read the hole diameter directly instead of reading the hole radius.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A fixture comprising a frame,
   said frame having a base and a beam disposed generally parallel to said base and rigidly fixed to said base,
   means on said base for supporting it on a machine table,
   a dial indicator,
   a plunger reciprocably supported in said frame,
   a post fixed on said base,
   said dial indicator being supported on said post at a position spaced from said plunger,
   an axle on said base swingably supporting said beam,
   a point on said dial indicator and a point on said plunger,
   said points engaging said beam,
   the space between said plunger point of said dial indicator and said axle being twice as great as the distance from said point on said plunger to said axle,
   said plunger having a top thereon adapted to be engaged by a test bar whereby the dial indicator will indicate twice the magnitude of the movement of said plunger.

2. The fixture recited in claim 1 wherein said means on the bottom of said frame are pads for supporting said frame on said machine table,
   and the side edges of said frame comprise surfaces perpendicular to said bottom of said pads.

3. The machine recited in claim 1 wherein said plunger is slidably received in an opening in said beam.

* * * * *